June 11, 1946. C. V. DI PIETRO 2,401,914
MIXING FAUCET
Filed Oct. 17, 1942 2 Sheets-Sheet 1
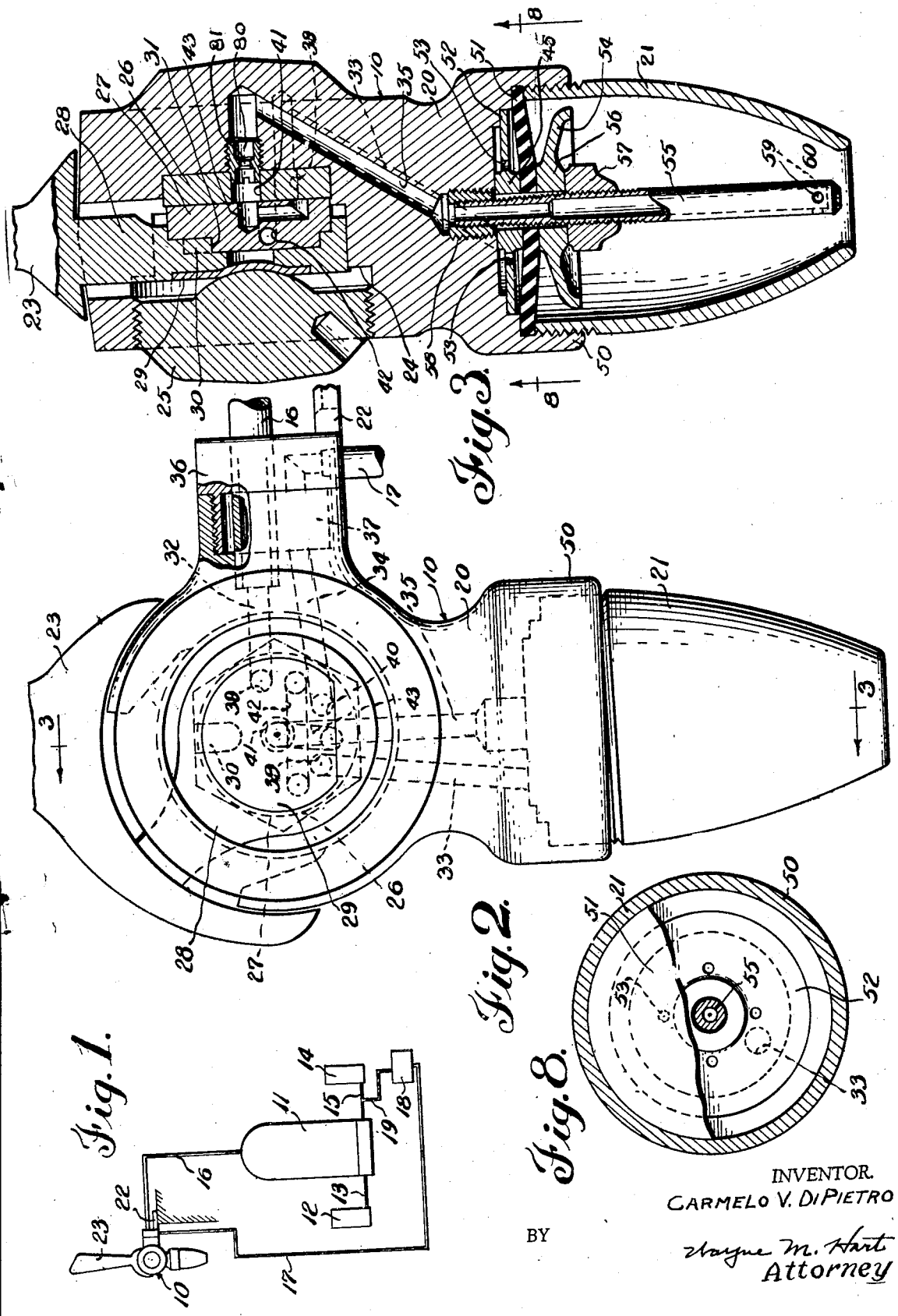
INVENTOR.
CARMELO V. DI PIETRO
BY
Wayne M. Hart
Attorney

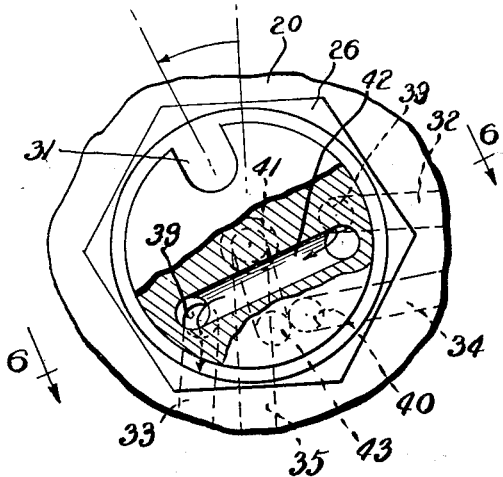
Fig. 4.
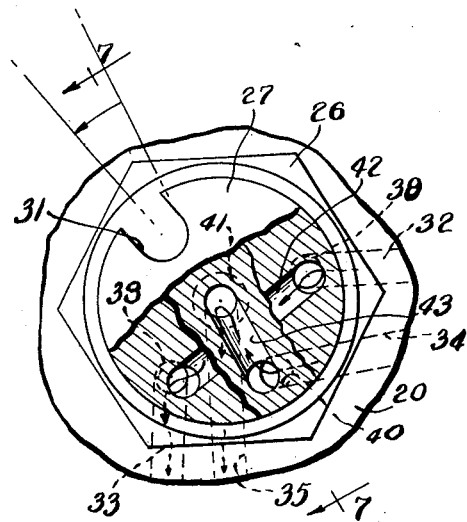
Fig. 5.
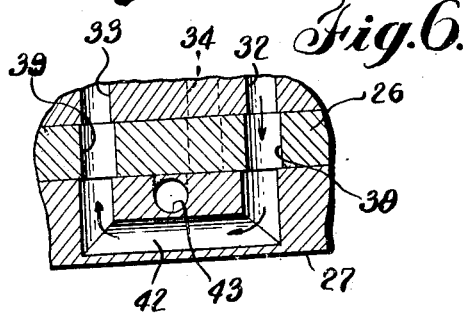
Fig. 6.
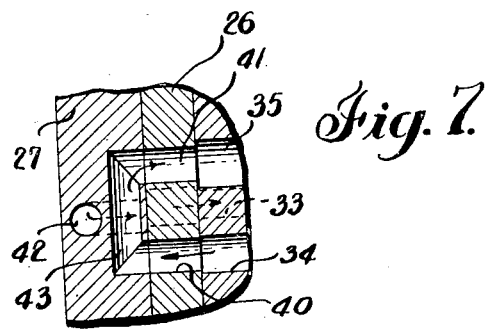
Fig. 7.
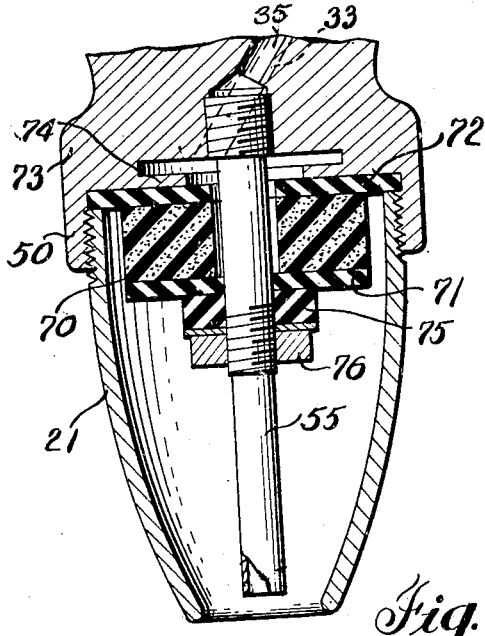
Fig. 9.
Fig. 10.
Fig. 11.
INVENTOR.
CARMELO V. DI PIETRO
BY
Wayne M. Hart
Attorney Patented June 11, 1946

2,401,914

UNITED STATES PATENT OFFICE 2,401,914

MIXING FAUCET

Carmelo V. Di Pietro, Birmingham, Mich.

Application October 17, 1942, Serial No. 462,439

9 Claims. (Cl. 225—26)

This invention relates to faucets and more particularly to mixing faucets for dispensing beverages.

An object of the invention is to provide a mixing faucet for dispensing a beverage consisting of plain or carbonated water and a syrup that retains the maximum palatable characteristics.

Another object of the invention is to provide a faucet through which water and syrup will flow and be mixed at the outlet end of the nozzle.

Another object of the invention is to provide a sanitary faucet for dispensing a beverage consisting of water and syrup.

Another object of the invention is to provide a faucet that will reduce the pressure of water passing therethrough to substantially gravity flow at the outlet end of the nozzle where it mixes with syrup.

Another object of the invention is to provide a faucet through which water and syrup flow in separate paths to a point outside of or adjacent the end of the nozzle.

Other objects of the invention will appear from the following description taken in connection with the drawings, which form a part of the specification, in which:

Fig. 1 is a diagrammatic view of a beverage dispensing system incorporating the invention.

Fig. 2 is an elevational view of a faucet incorporating the invention.

Fig. 3 is a sectional view of the faucet taken on line 3—3 of Fig. 2.

Fig. 4 is a fragmentary elevational view of the flow control portion of the faucet, partly broken away.

Fig. 5 is a view similar to that of Fig. 4 and broken away to show the passages in the control portion of the faucet.

Fig. 6 is a sectional view through the flow control portion of the faucet taken on line 6—6 of Fig. 4.

Fig. 7 is a sectional view through the flow control portion of the faucet taken on line 7—7 of Fig. 5.

Fig. 8 is a sectional view of the faucet taken on line 8—8 of Fig. 3.

Fig. 9 is a perspective view of the tumbler portion of the faucet.

Fig. 10 is a perspective view of the stationary valve element.

Fig. 11 is a sectional view of the nozzle portion of a faucet showing a modified form of the invention.

The faucet 10, forming the subject matter of the invention, is shown as part of a dispensing system for beverages consisting of syrup and either plain or carbonated water. Carbonator 11 is connected with a source of carbon dioxide gas 14 by conduit 15 and with a source of water 12 by conduit 13. The water and gas sources are under pressure and are mixed upon entering the carbonator. Conduit 16 connects the storage portion of the carbonator with the faucet and conduit 17 connects the faucet with a source of syrup 18. The syrup is held under pressure by the carbon dioxide gas through means of conduit 19 leading from conduit 15 to the syrup storage source 18.

The faucet has a body 20 to the outlet end of which is affixed a dispensing nozzle 21 and separate passages extend through the body for receiving the flow of water and syrup from their sources of supply. The body has a suitable bracket 22 fixed thereto for connecting it to a dispensing station, such as a fountain, and the flow through the passages is controlled by valve means actuated by arm 23.

The body is formed with a recess 24 in which the valve means is located and the valve means is retained in the recess by screw plug 25. The valve means consists of a hexagonal member 26, formed of leather or some material suitable for also acting as a gasket, and tumbler 27 in the form of a disk. The gasket is held from rotating due to its form and the tumbler is rotatable in the body recess. Shank 28 of the control arm lies adjacent the tumbler and carries a bearing plate 29 against which the screw plug is engaged to retain the arm shank and valve members in leak-proof positions. Shank 28 has a lug 30 engaging in recess 31 in the periphery of the tumbler so that operation of the arm will cause the tumbler to move therewith.

The passage for water in the body connects with the recess and has an angularly extending inlet portion 32 and an angularly extending outlet portion 33. The passage for the syrup in the body also connects with the recess and has an angularly extending inlet portion 34 and an angularly extending outlet portion 35. Conduit 16 is connected with the faucet body in communication with the water inlet passage portion 32 and extends through a fitting 36 that screws into the body. Conduit 17 is secured to the fitting and opens into chamber 37 in communication with the syrup passage inlet portion 34 in the body.

The valve member 26 has passages 38, 39, 40, and 41 therethrough. Passage 38 is in open communication with the water inlet passage portion 32 in the body and passage 39 is in open communication with the water outlet passage portion 33 in the body. Passage 40 is in open communication with the syrup inlet passage portion 34 in the body and passage 41 is in open communication with the syrup outlet passage portion 35 in the body. The tumbler is formed with angularly extending passages 43 and 42, the latter being shiftable to connect or shut off passages 38 and 39 and passage 43 being shiftable to connect or shut off passages 40 and 41. Swinging of arm 23 will rotate the tumbler so that passages 42 and 43 will be placed into or out of registration with the passages in member 26 to allow or shut off flow of syrup and water through the faucet.

Referring now to the faucet shown in Fig. 3, the nozzle is screwed into flange 50 at the outlet end of the body against the peripheral portion of a diffuser 51. Fixed in the recessed end of the body above the diffuser is disk 52 having holes 53 therethrough adjacent the hub portion 45. Water flows from passage 33 into the recess and from there through holes 53 to the diffuser. The diffuser is in the form of a disk and is made of porous flexible material, such as rubber. The pores extend in an axial direction through the disk and are very small forming a large number of passages through which the water must flow to enter the nozzle. The pressure of the water when released by the valve means in the body will expand the passages in the diffuser to some extent, but in any event the diffuser will materially reduce the water pressure and velocity before it enters the nozzle so that it will flow very slowly through the nozzle. The velocity reduction lessens agitation of the beverage flowing into the receiving receptacle so that the gas does not become liberated and maximum carbon dioxide gas will remain in the water. Thus, the mixed drink will be highly charged with the gas so that a very palatable drink will be drawn. The diffuser is of a character such that it serves as a filter for the water flowing therethrough.

A baffle 54 is arranged to direct the low pressure water flowing through the diffuser to the inner wall of the nozzle. The water so deflected will hug the wall of the nozzle in its flow from the diffuser to the outlet end.

The diffuser and the baffle are both secured to the tube 55 to provide a unit structure that can be readily attached to or removed from the body. The tube is threaded and screws into a sleeve 58 screwed into the syrup passage outlet portion 35 in the body. The central aperture in the diffuser can be of smaller diameter than the tube so that it can be stretched to be assembled on or removed from the tube, and will thus be selfretaining on the tube when released. The baffle hub portion 56 surrounds the tube adjacent the diffuser and a nut 57 is screwed on the tube to press the baffle into engagement with the diffuser and the diffuser into engagement with the hub 45 of disk 52. The nut can be adjusted to squeeze the diffuser and thus change the porous characteristics of the diffuser so that the resistance offered thereby to water flow therethrough can be regulated. In this manner the velocity of the water passing from the diffuser into the nozzle can be regulated to suit various types of beverages.

As shown in Fig. 3, the tube extends axially through the nozzle to a point adjacent the outlet end thereof and can have radially extending outlet openings 59 in the tip portion 60. The syrup will spray into the water flowing down the nozzle and will mix therewith at the outlet end of the nozzle without contacting the interior wall of the nozzle. Because of the separate passages and the tube arrangement in the nozzle, the syrup and water will flow substantially through the faucet without mixing. The distance the syrup outlet openings in the tube are from the outlet end of the nozzle determines the extent of agitation of the mixture, but in any event the water flowing down the wall of the nozzle will prevent the syrup from remaining in the nozzle when the valve means is closed. The foam in the beverage depends on the amount of agitation so the syrup outlet openings in the tube can be arranged to suit the mixture being dispensed.

The faucet parts are assembled and related so that they can be readily taken apart and cleaned. The syrup will be conducted through the nozzle and faucet body so that bacteria formation is substantially eliminated. The drinks dispensed by the faucet will have unvarying proportions of water and syrup, and will be highly charged with gas so that the drink will have maximum palatability.

In the form of the invention shown in Fig. 11, the diffuser is formed of a sponge rubber disk 70 having communicating cells therein through which the water flows in passing from the body to the nozzle. Hard non-porous rubber disks 71 and 72 are vulcanized, or otherwise fixed, to the top and bottom surfaces of the sponge rubber disk. The outlet end of the body has an interior flange 74 against which the top disk is clamped by the nozzle when screwed into the body. The syrup tube 55 passes through the diffuser and disks 71 and 72 and screws into sleeve 58, as previously described. Water passage 33 opens into a recess in the body above flange 74 and the disk 72 and diffuser fit loosely around the tube so that water can flow along the tube to the interior of the diffuser and radially therethrough onto the inner adjacent wall of the nozzle. The deflector will not be necessary in this structure. A flexible disk 75 on the tube engages disk 71 and nut 76 is screwed on the tube to cause disk 75 to regulate the compression of the sponge rubber diffuser. The character of the cell structure of the diffuser can thus be regulated as desired to control the velocity of the water flowing therethrough to suit beverage requirements.

As previously explained, the tube in Fig. 3 has radially extending outlet openings to cause desired agitation and mixture adjacent the outlet end of the nozzle. In Fig. 11, the syrup flows straight through the end of the tube and will not mix with the water until after it passes out of the nozzle, this form of tube outlet being preferred when minimum agitation producing foam is desired in the dispensed beverage.

The water flow through the valve means is best shown in Figs. 4 and 6 while the syrup flow through the valve means is best shown in Figs. 5 and 7. The valve means is preferably constructed so that the water will flow through the body slightly before the syrup can flow and slightly after the syrup has been shut off. As the tumbler is turned from off position toward open position, or from open position to closed position, passage 38 is open to passages 32 and 42 slightly before passage 40 communicates with passages 34 and 43 and slightly after such passages are closed. This condition is desirable because the diffuser delays the water flow and also because it is generally desirable to have the water flowing before and after the syrup. When water is in the receptacle before the syrup, there is less agitation and consequent release of carbon dioxide gas. With the water flow through the nozzle after the syrup flow has stopped, the syrup that may be in the nozzle is washed out. Plug 80 is arranged in passage 35 to control syrup flow rate, the diameter of orifice 81 being of a diameter to suit the proportion of syrup to water desired in the beverage.

What I claim is:

1. A faucet for dispensing water under pressure comprising a body having a valved passage therethrough, an outlet nozzle on the body in communication with the outlet end of the passage, a porous flexible member through which the water passes in flowing from the body to the nozzle, and means for adjusting the porosity characteristics of said member whereby regulating the velocity of the water passing into the nozzle.

2. A faucet for dispensing water under pressure comprising a body having a valved passage therethrough, an outlet nozzle fixed to the body in communication with the outlet end of the passage, a porous rubber member through which water flows from the passage to the nozzle, and means for squeezing the rubber member to regulate the porosity thereof whereby the velocity of water flow into the nozzle can be regulated.

3. A faucet for dispensing a liquid flowing thereto under pressure comprising a body having a passage through which the liquid passes, a valve in the body controlling flow through the passage, and an elastic diffuser means in the body passage between the outlet end and the valve having a multiplicity of normally contracted passages therethrough expansible under fluid pressure when the valve is open, the resistance of said diffuser materially reducing the velocity of the water passing therethrough.

4. In a faucet for dispensing carbonated water under relatively high pressure, a body having a passage through which the carbonated water flows when being dispensed, and a diffuser in the passage having a multiplicity of normally contracted passages therein through which the carbonated water flows, said diffuser reducing the water pressure to such an extent that it flows by gravity therefrom.

5. A faucet for dispensing carbonated water flowing thereto under pressure comprising a body having a passage connected with the carbonated water, and an elastic porous diffuser at the outlet end of the passage, the pores in said diffuser being normally contracted and expanding under pressure of the water passing therethrough to reduce the pressure of the water without agitation.

6. A faucet for dispensing carbonated water stored under pressure comprising a body having a passage connected with the carbonated water, an outlet nozzle secured to the body in overlying relation with the outlet end of the passage, and a porous rubber diffuser member secured in overlying relation with the outlet end of the passage in the body, the pores in said diffuser member being normally contracted and expanding a limited extent under pressure of the water flowing therethrough from the body passage to materially reduce the water pressure without agitation.

7. In a faucet having a body with separated passages therethrough for water and syrup under pressure and a nozzle fixed to the body in communication with the passages, flow control means comprising a porous diffuser disk in the nozzle covering the outlet end of the water passage in the body, a tube extending through the disk and secured to the body in communication with the syrup passage, and a baffle secured on the tube and engaging the disk to clamp it against the body, said baffle directing the water flowing through the disk toward the inner face of the nozzle.

8. In a faucet having a body with a pair of passages therein connected one with a carbonated water supply and the other with a syrup source and a nozzle enclosing the outlet ends of the passages, flow control means comprising a ring of porous sponge rubber overlying the outlet end of the water passage in the body and of slightly less diameter than the nozzle, a tube extending through the ring and fixed to the body in communication with the syrup passage, the diameter of the hole in the ring being larger than the tube diameter, means sealing the end of the ring remote from the body, and means securing the ring axially on the tube in close proximity to the body.

9. A faucet for dispensing a liquid flowing thereto under pressure comprising a body having a passage therein, a nozzle fixed to the body in communication with the outlet end of the passage, and a sponge rubber diffuser through the pores of which liquid must flow from the body passage into the nozzle, the pores in said diffuser being normally contracted and expanding under the pressure of liquid flowing therethrough.

CARMELO V. DI PIETRO.